(12) United States Patent
Harkey

(10) Patent No.: US 6,278,254 B1
(45) Date of Patent: Aug. 21, 2001

(54) PROGRAMMABLE AND INTERACTIVE MOTOR STARTER

(76) Inventor: Richard D. Harkey, 1363 Rosana Way, Rohnert Park, CA (US) 94928

( * ) Notice: Subject to any disclaimer, the term of this patent is extended or adjusted under 35 U.S.C. 154(b) by 0 days.

(21) Appl. No.: 09/268,497

(22) Filed: Mar. 11, 1999

(51) Int. Cl.[7] ........................................................ H02P 1/26
(52) U.S. Cl. ........................ 318/778; 318/254; 318/439; 318/138; 318/798; 318/430; 318/434
(58) Field of Search .................................... 318/254, 439, 318/138, 798, 778, 430, 434; 361/30

(56) References Cited

U.S. PATENT DOCUMENTS

| | | | |
|---|---|---|---|
| 5,245,496 | * | 9/1993 | Kim et al. ................................ 361/30 |
| 5,835,786 | * | 11/1998 | Brown et al. ......................... 385/835 |
| 5,875,087 | * | 2/1999 | Spencer et al. ......................... 361/30 |

* cited by examiner

Primary Examiner—Karen Masih
(74) Attorney, Agent, or Firm—Walter J. Teneza, Jr.

(57) ABSTRACT

An apparatus comprised of a processor, a display, and a current measuring device is provided. The current measuring device is adapted to measure the current in a first winding of a first stator of an alternating current motor. The processor causes a first message to be placed on the display if the current in the first winding of the first stator falls outside a first range of values. The first high value and the first low value can be stored in a memory device. The current measuring device may have two input ports, for measuring current in first and second windings of the first stator of the alternating current motor. The processor may cause a second message to be placed on the display if the current in the second winding of the first stator falls within a second range of values. A first relay device for selecting between a first start signal and a first run signal. During a start time period, the processor causes the first start signal to be transmitted to the first winding of the first stator. During a run time period, the processor causes the first run signal to be transmitted to the first winding of the first stator. The apparatus may also include a phase shifter, for sending a signal to a second winding of the first stator. A second relay device may be provided for selecting between a second start signal and a second run signal.

12 Claims, 11 Drawing Sheets

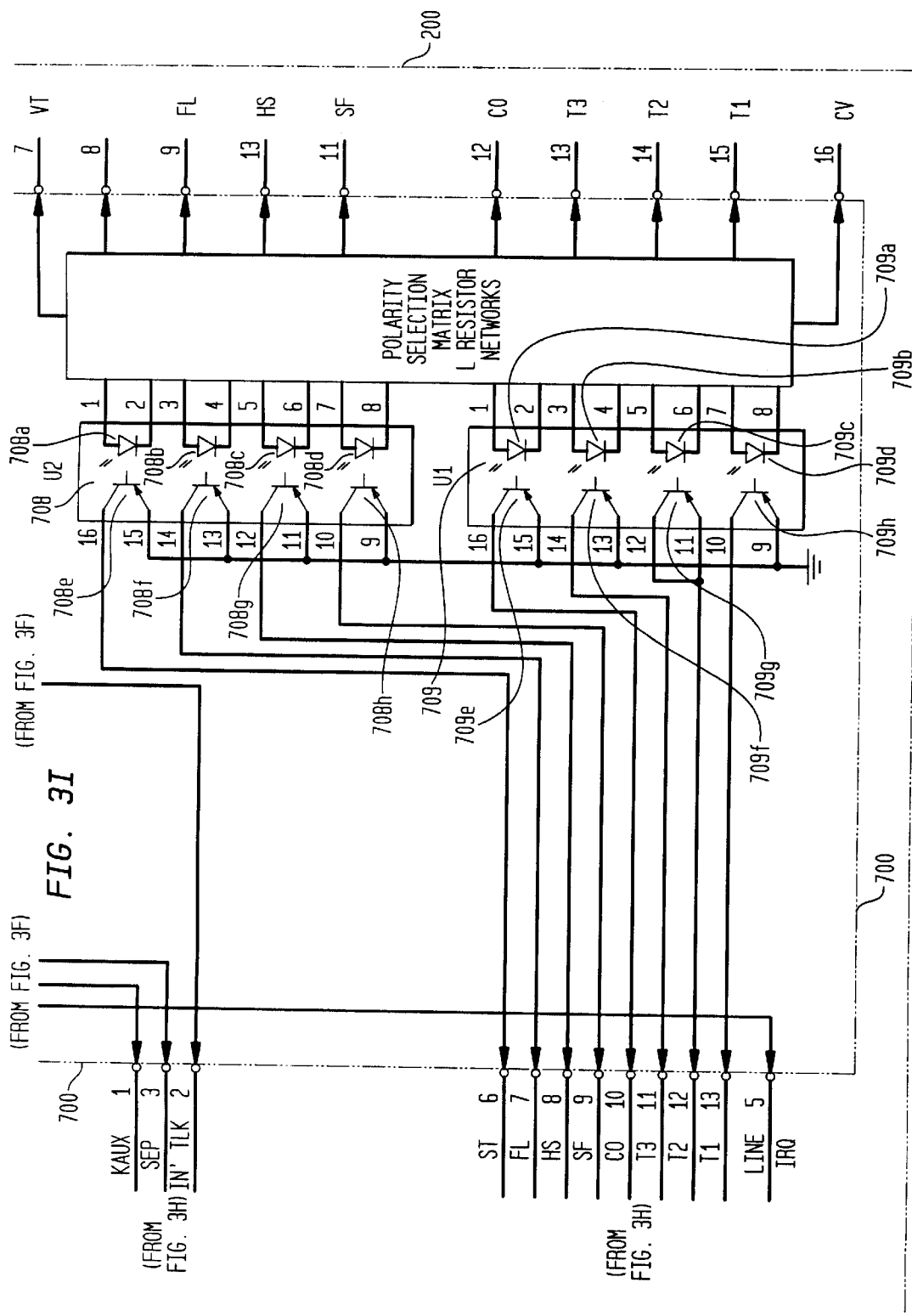

PROGRAMMABLE AND INTERACTIVE MOTOR STARTER

FIELD OF THE INVENTION

This invention relates to methods and apparatus for motors, anode rotators, and/or high speed starters.

BACKGROUND OF THE INVENTION

Anode rotators, also known as high speed starters, generally, are known in the art. An anode rotator supplies current to a stator which causes the spinning of a rotor of an X-ray tube (or motor) at different speeds. Low speed is typically operated at 50–60 Hertz (line operated) and high speed is operated at 180 hertz. There is a need for improved anode rotators.

SUMMARY OF THE INVENTION

The present invention in one embodiment provides an apparatus comprised of a processor, a display, and a current measuring device. The current measuring device is adapted to measure the current in a first winding of a first stator of an alternating current motor. The processor causes a first message to be placed on the display if the current in the first winding of the first stator falls outside a first range of a first high value and a first low value.

The apparatus may be further comprised of a memory device. The first high value and the first low value can be stored in the memory device. The current measuring device may have two input ports, for measuring current in first and second windings of the first stator of the alternating current motor. The processor may cause a second message to be placed on the display if the current in the second winding of the first stator falls outside a second range of a second high value and a second low value.

The apparatus may further be comprised of a first relay device for selecting between a first start signal and a first run signal. During a start time period, the processor may send a signal to a control input port of the first relay device to cause the first start signal to be transmitted through the first relay device to the first winding of the first stator. During a run time period, the processor may send a signal to the control input port of the first relay device to cause the first run signal to be transmitted through the first relay device, and to thus be applied to the first winding of the first stator.

The first start signal and first run signal can be alternating voltages having a frequency of sixty hertz.

The apparatus may also include a phase shifter. The phase shifter may have an input port connected to the output port of the first relay device and an output port connected to a second winding of the first stator.

A second relay device may be provided for selecting between a second start signal and a second run signal. During a second start time period, the processor sends a signal to the control input port of the second relay device to cause the second start signal to be applied to the first winding of the first stator. During a second run time period the processor sends a signal to the control input port of the second relay device to cause the second run signal to be applied to the first winding of the first stator.

The first start signal and the first run signal may have a low frequency while the second start signal and the second run signal may have a second frequency substantially higher than the first frequency. The first frequency may be about sixty hertz and the second frequency may be about one hundred and eighty hertz.

The first start signal may have a first alternating voltage which has a high amplitude, such as 500 volts, and the second alternating voltage may have an amplitude substantially lower than the first alternating voltage, such as 65 volts.

A keypad may be provided comprised of a plurality of buttons and having an output port connected to the input port of the processor. A second relay device may be provided for selecting among a plurality of stators.

There can be three switches connected to an interface circuit corresponding to three stators. An operator activates the first of the three switches (such as by pressing a button) to cause a second relay device to transmit signals to a first stator. An operator activates the second of the three switches to cause a second relay device to transmit signals to a second stator. An operator may activate the third of the three switches to cause a second relay device to transmit signals to a third stator.

Pressing one or more buttons of the keypad in a another sequence causes the processor to obtain a first current measurement from the current measurement device, to add a high constant to the first current measurement to obtain the first high value, to add a low constant to the first current measurement to obtain a first low value, and to store the first high value and the first low value in the memory device.

DETAILED DESCRIPTION OF THE DRAWINGS

Figure 1:
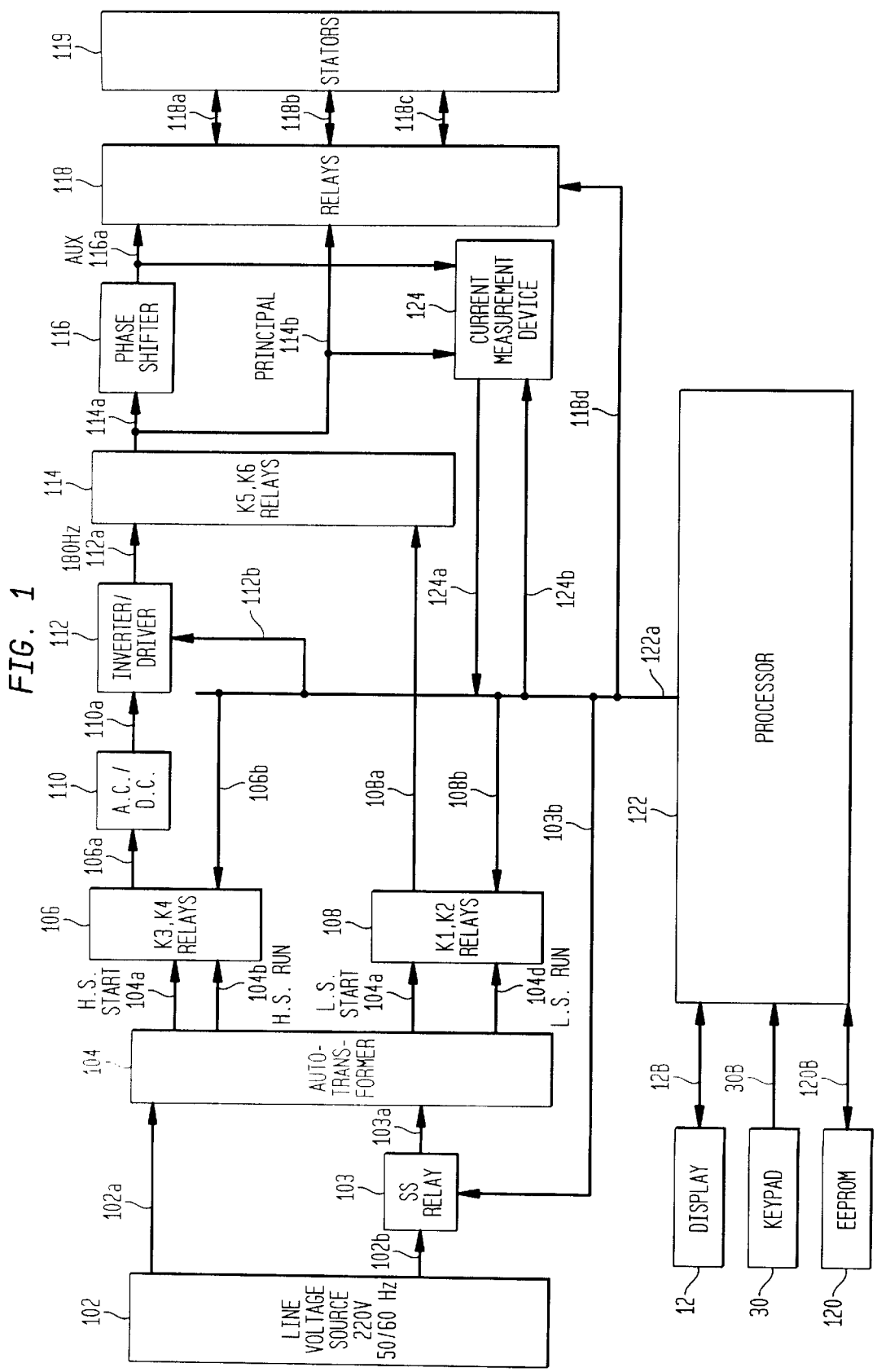
FIG. 1 shows a block diagram of an apparatus for operating a motor in accordance with the present invention.

FIG. 1 shows a block diagram of an apparatus 100 for operating a motor or more specifically for supplying alternating current to a stator of a motor for causing the rotor of the motor to rotate. The apparatus 100 includes a display 12, a keypad 30, a line voltage source 102, a solid state ("SS") relay 103, an autotransformer 104, a relay device 106, a relay device 108, an A.C. to D.C. converter (alternating current to direct current) 110, an inverter/driver 112, a relay device 114, a phase shifter 116, a relay device 118, a group of stators 119, a current measurement device 124, an EEPROM (Electronic Erasable Programmable Read Only Memory) memory device 120, and a Processor 122.

The line voltage source 102 can be a standard source having an amplitude of 220 volts and a frequency of sixty hertz. A signal from the line voltage source 102 is transmitted on bus 102a to autotransformer 104. Another signal is transmitted from the line voltage source 102 on bus 102b to SS relay 103. The SS relay 103 is connected to the processor 122 via busses 103a and 122a. The output of the SS relay 103 is sent via bus 103a to the autotransformer 104. The solid state relay turns the power off to the transformer 104 just prior to switching any of the relays such as relays 106, 108, 114, or 118 or other relays so that there is zero voltage when the relays are switched. This prevents arcing from occurring at the relay contacts. In this application each "port" or "bus", such as bus 102a, may actually be comprised of an output port, a conductor, and an input port. I.e. Line voltage source 102 would have an output port connected via a conductor to an input port of autotransformer 104.

An output can be taken from autotransformer 104 from port 104a, port 104b, port 104c, or port 104d. The output at port 104a is the signal that will be used to derive the start voltage for starting a motor at high speed (high speed can be 180 Hertz). The output at port 104b is the signal that will be used to derive the run voltage for running of a motor at high speed. The output at port 104c is the start voltage for a motor at low speed (60 Hertz). The output at port 104d is the run voltage for the running of a motor at low speed (60 Hertz).

The signals to be used for the high speed case (which actually are still in a 60 hertz form at this point) on ports 104a and 104b are transmitted to relay device 106. The relay device 106 chooses either the start signal on port 104a or the run signal on port 104b and outputs one of the two on port 106a. The output signal from relay device 106 is then transmitted to A.C./D.C. converter 110 (alternating current to direct current converter) which takes in an alternating signal at port 106a and outputs a D.C. signal at port 110a. The D.C. signal is then transmitted to inverter/driver 112. The inverter driver 112 takes an input D.C. signal at port 110a and produces an alternating signal having a frequency 180 Hz. at port 112a. The signal at port 112a is the high speed signal (either start or run). In a high speed case the high speed signal at port 112a would be selected by relay device 114 and output to port 114a. The signal at port 114a is transmitted to port 114b which is connected to the relay device 118, and to port 114c which is connected to phase shifter 116.

The phase shifter 116 takes the signal at port 114c and outputs a phase shifted signal at port 116a. The signal at port 116a is the phase shifted or auxiliary signal and it is sent to the relay device 118. Relay device 118 connects port 114b (principal current) and ports 116a (auxiliary current) to the principal winding and auxiliary winding (respectively) of a stator (or X-ray tube) of a motor. Ports 118a, 118b, 118c, are connected to first, second and third stators respectively. Ports 118a, 118b, and 118c actually represent two separate ports (one for principal winding and one for auxiliary winding). The relay device 118 selects one of the ports 118a, 118b, or 118c for the appropriate stator.

For the low speed case (60 Hertz) the signals to be used are transmitted to relay device 108. Relay device 108 selects between either the start signal on port 104c or the run signal on port 104d. One or the other is output on port 108a. The signal on port 108a is transmitted to relay device 114 which selects either the high speed signal on port 112a or the low speed signal on port 108a.

The processor 122 controls many, if not all the components of the apparatus 100 in FIG. 1 through bus 122a. Bus 122a may actually be comprised of a data bus, address bus, control signals and many other signals. The processor 122 controls whether a start or run high speed signal derivation signal (i.e. derived from 60 Hz.) is chosen by controlling relay device 106 through bus 122a and bus 106b. Relay device 106 may actually be comprised of two relays, one for the start signal and one for the run signal. The processor 122 controls whether a start or run low speed signal is chosen by controlling relay device 108 through bus 122a and bus 108b. Relay device 108 may actually be comprised of two relays, one for the low speed start signal and one for the low speed run signal.

The processor 122 controls inverter/driver 112 through bus 122a and bus 112b. The processor 122 can provide clock pulses through bus 122a and bus 112b, which allow the D.C. signal at port 110a to be chopped into a 180 Hz. signal at port 112a. The processor 122 controls relay device 114 through bus 122a and bus 114b. Relay device 114 selects either the high speed signal or the low speed signal.

The processor 122 receives an input from port 124a to its bus 122a from the current measuring device 124. The processor 122 uses the input signals from the current measuring device 124 to, for example, display messages on display 12 through bus 122a and bus 112b. The processor 122 also controls relay device 118 which determines which stator (i.e. which X-ray tube) is selected. Ports 118a, 118b, and 118c are connected to first, second, and third stators of first, second, and third motors, respectively.

The processor 122 may also read and write to and from the EEPROM memory device 120 through bus 122a and bus 120b. The EEPROM contains high and low values of expected principal and auxiliary current for ports 116a and 114b. The processor 122 can received inputs from keypad 30 from bus 30b and bus 122a.

Figure 2:
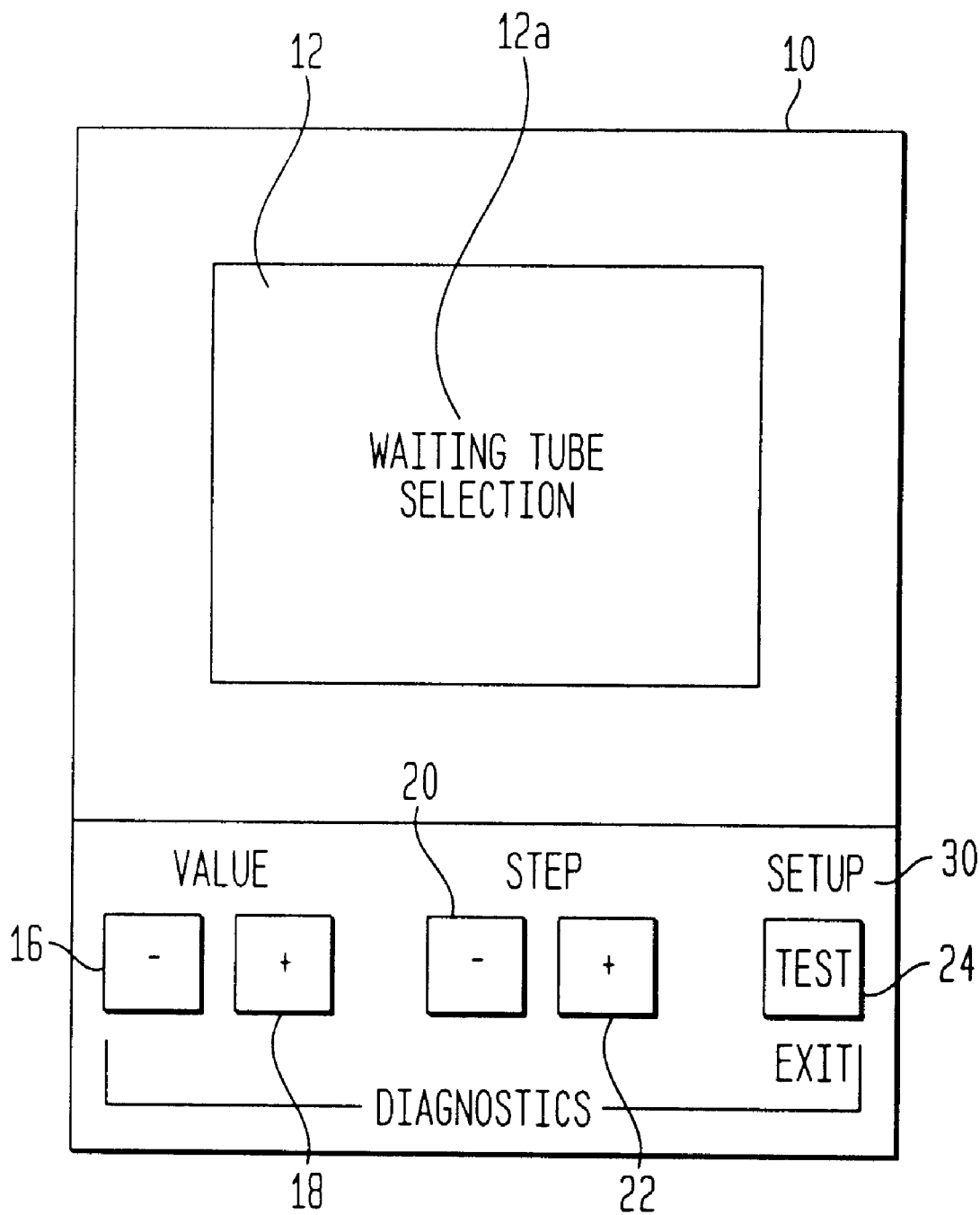
FIG. 2 shows a display and a keypad for use with an apparatus of FIG. 1 in accordance with the present invention.
Figure 3A:
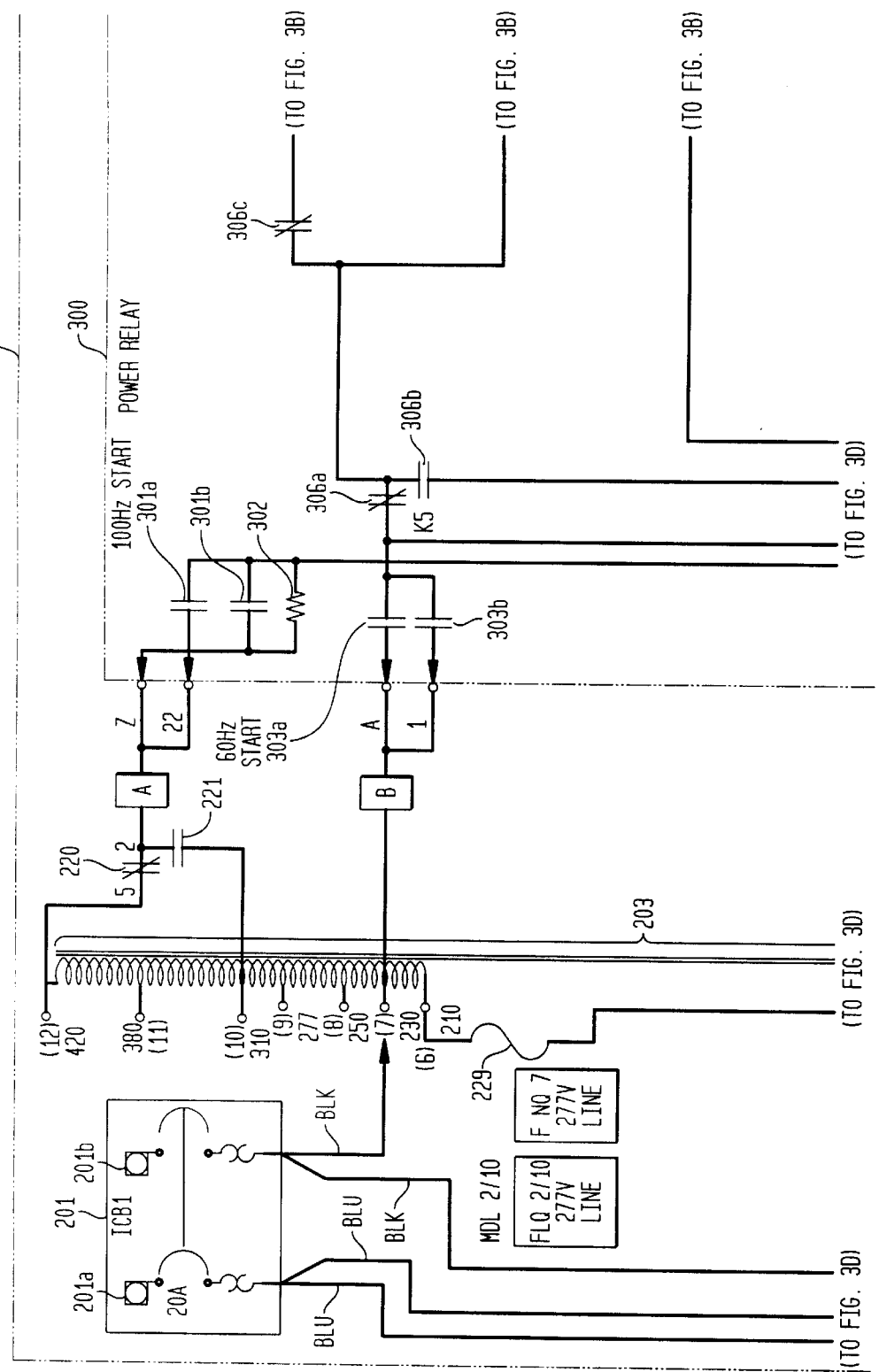
FIG. 3 shows a schematic diagram of a circuit for use in accordance with an embodiment of the present invention.
Figure 3B:
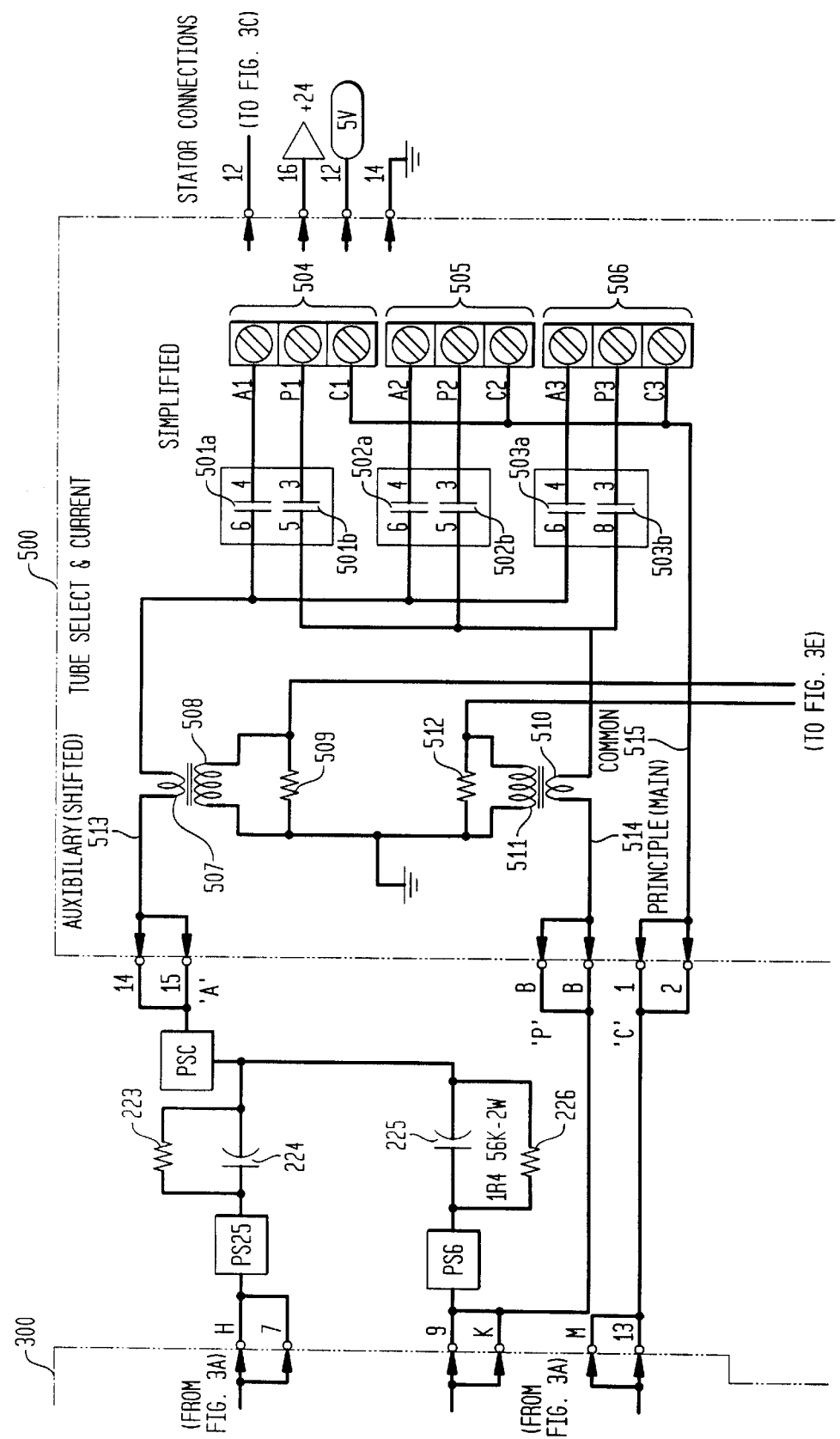
Figure 3C:
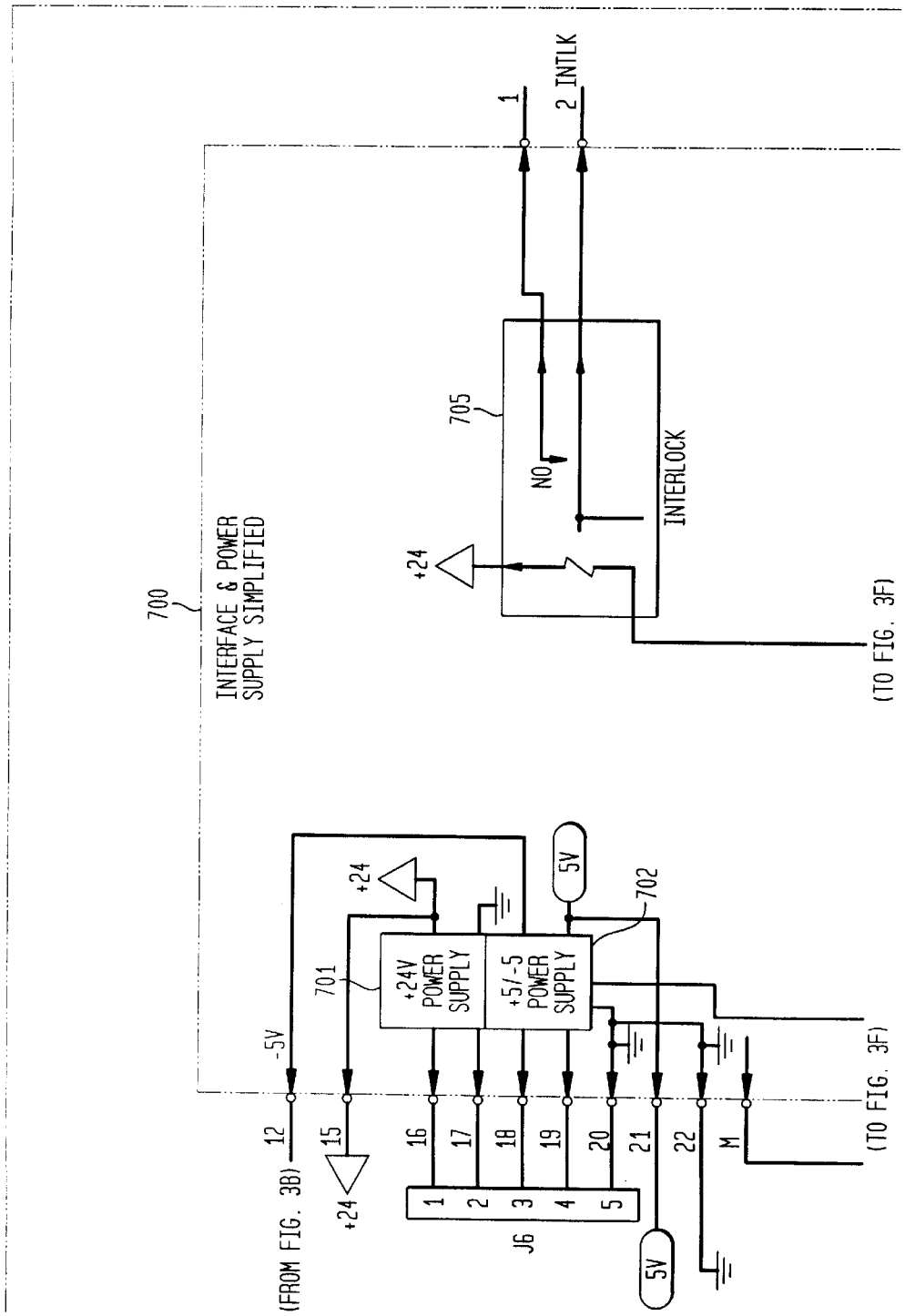
Figure 3D:
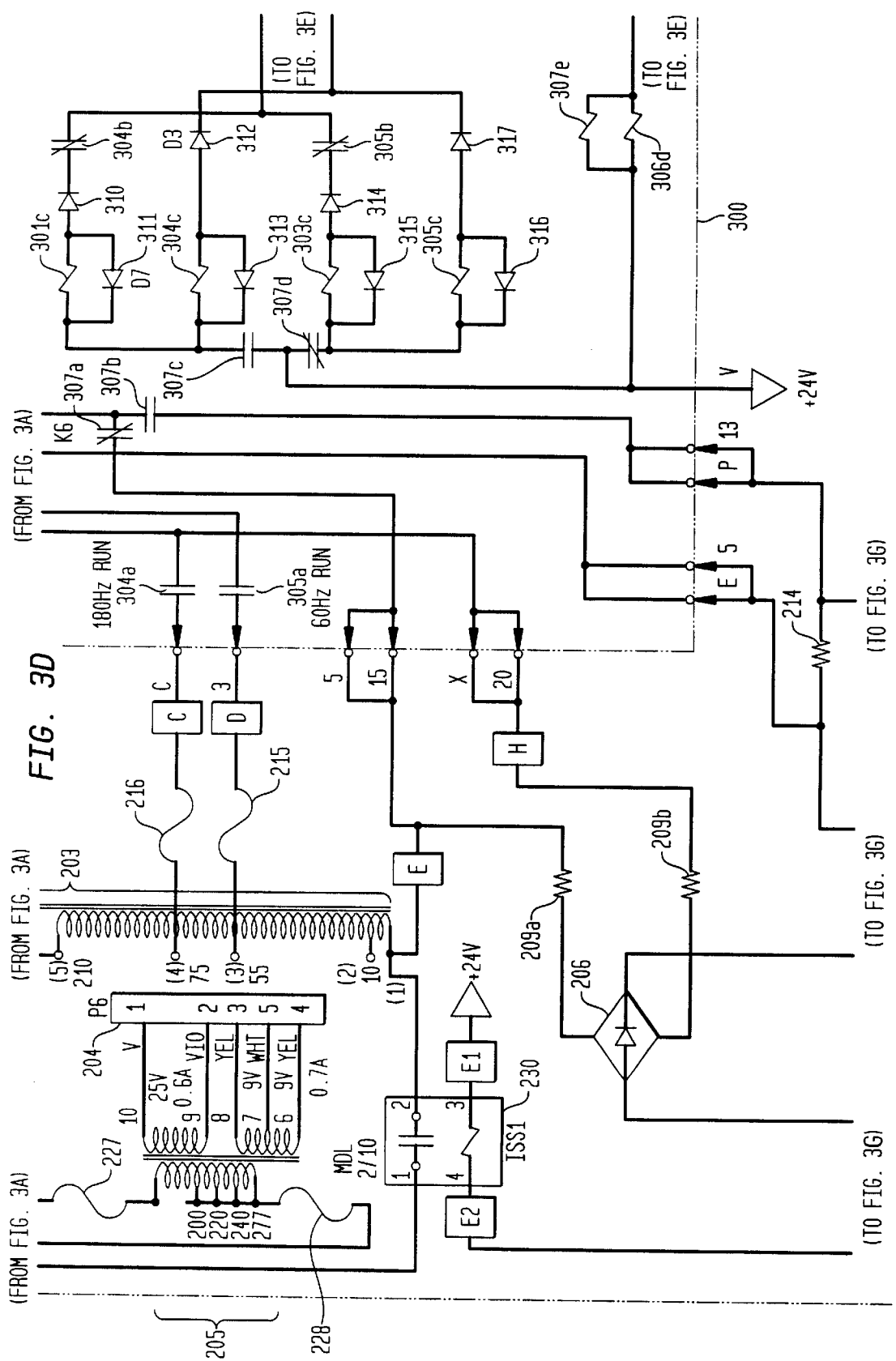
Figure 3E:
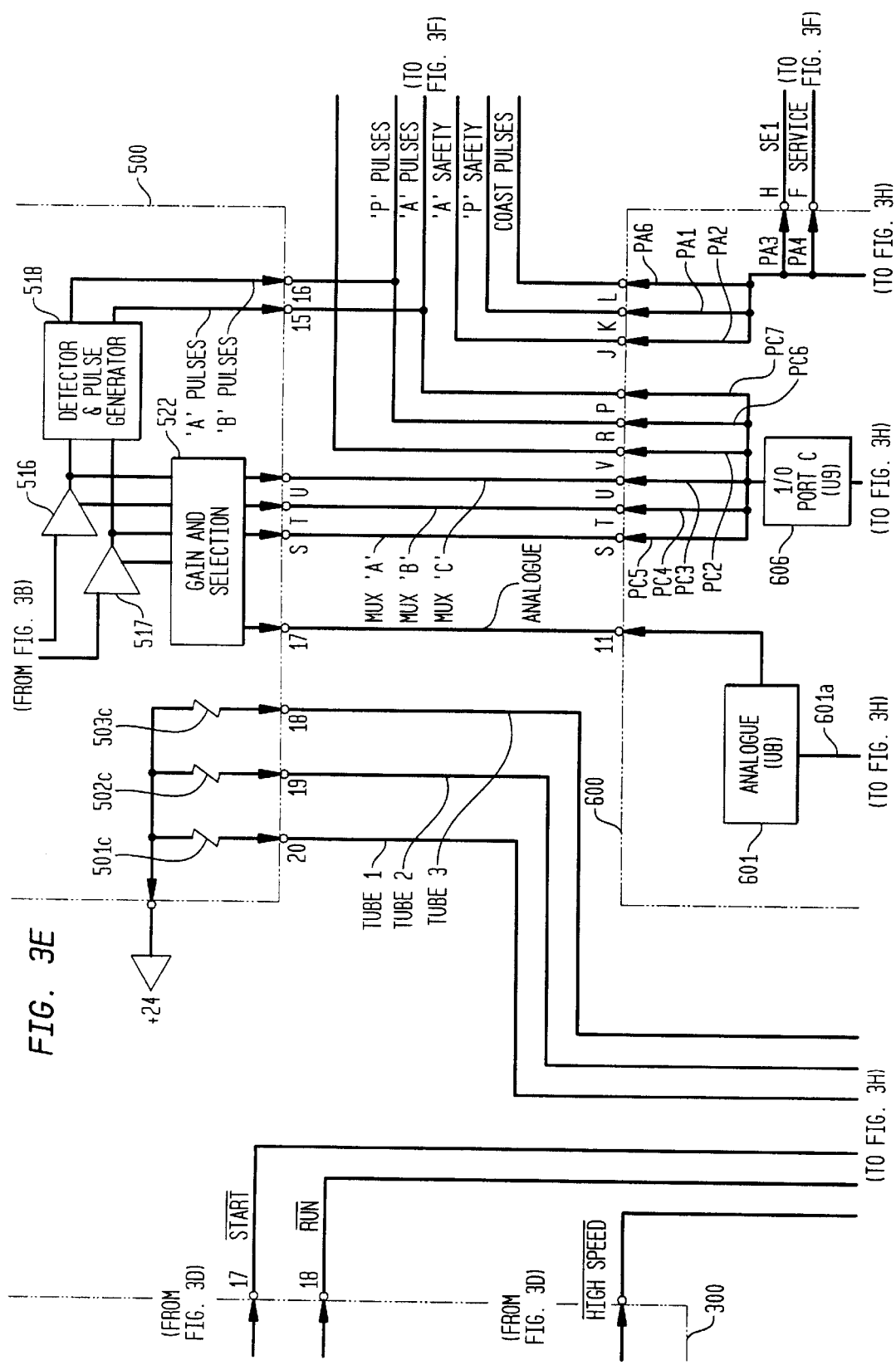
Figure 3F:
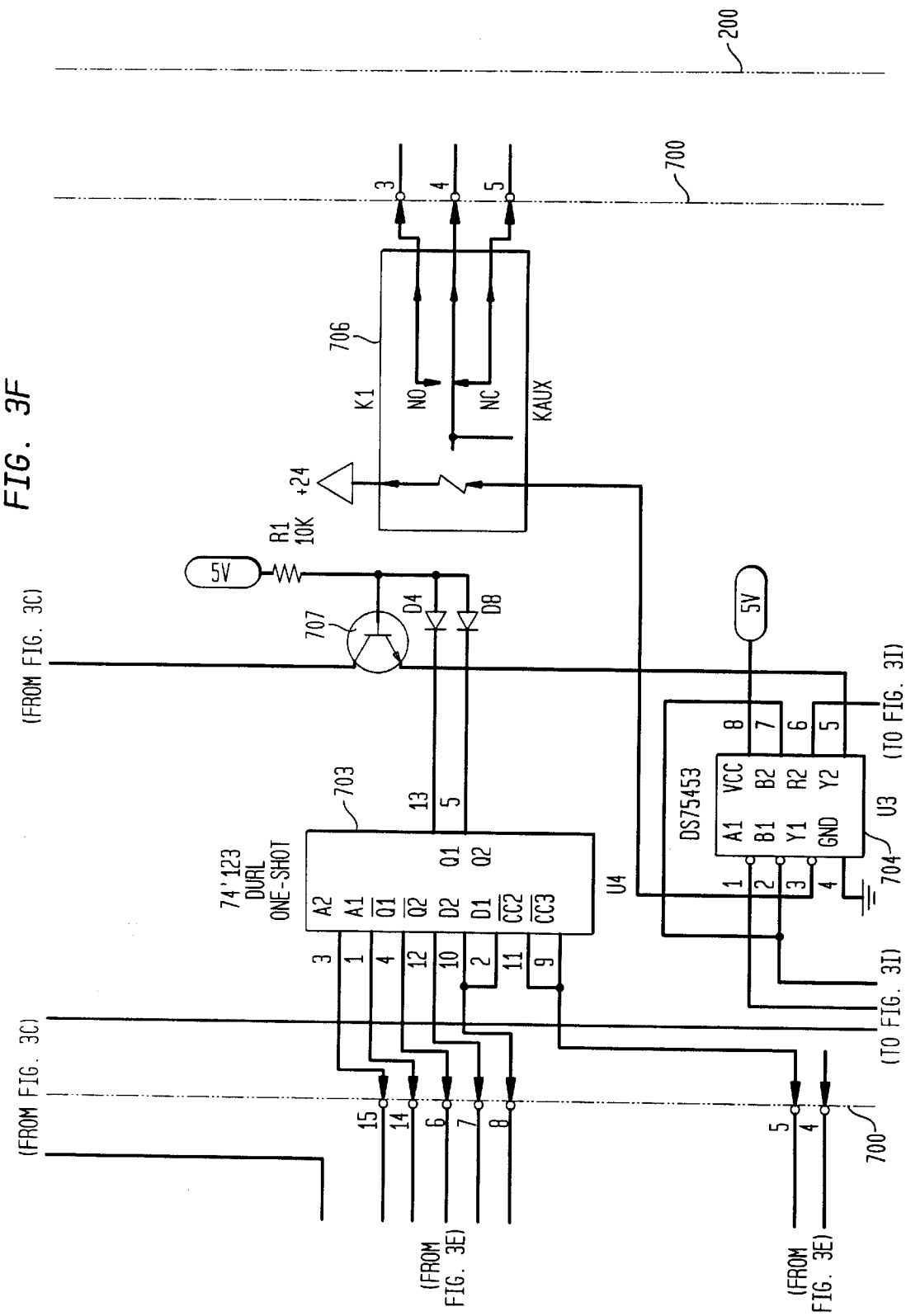
Figure 3G:
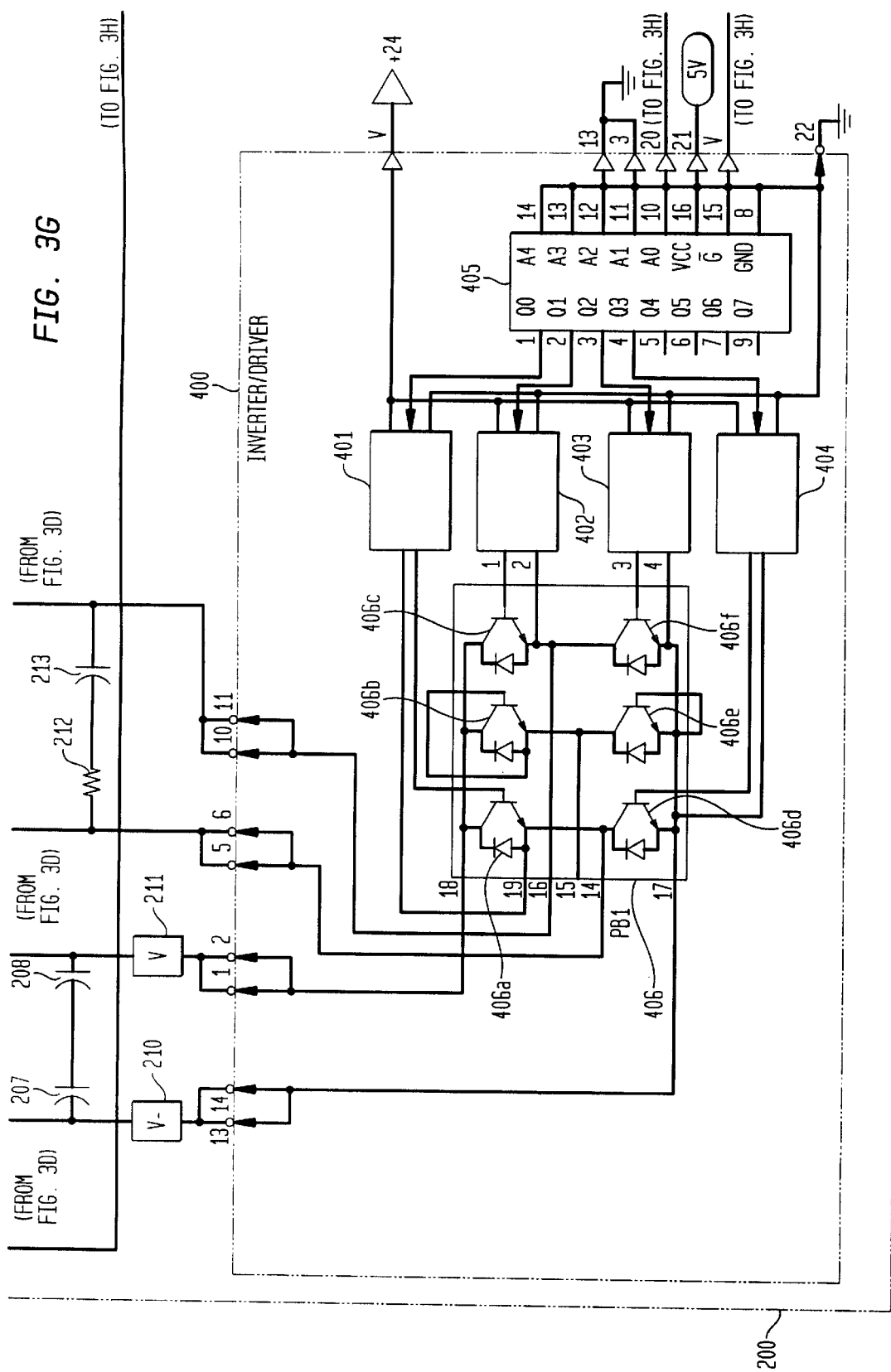
Figure 3H:
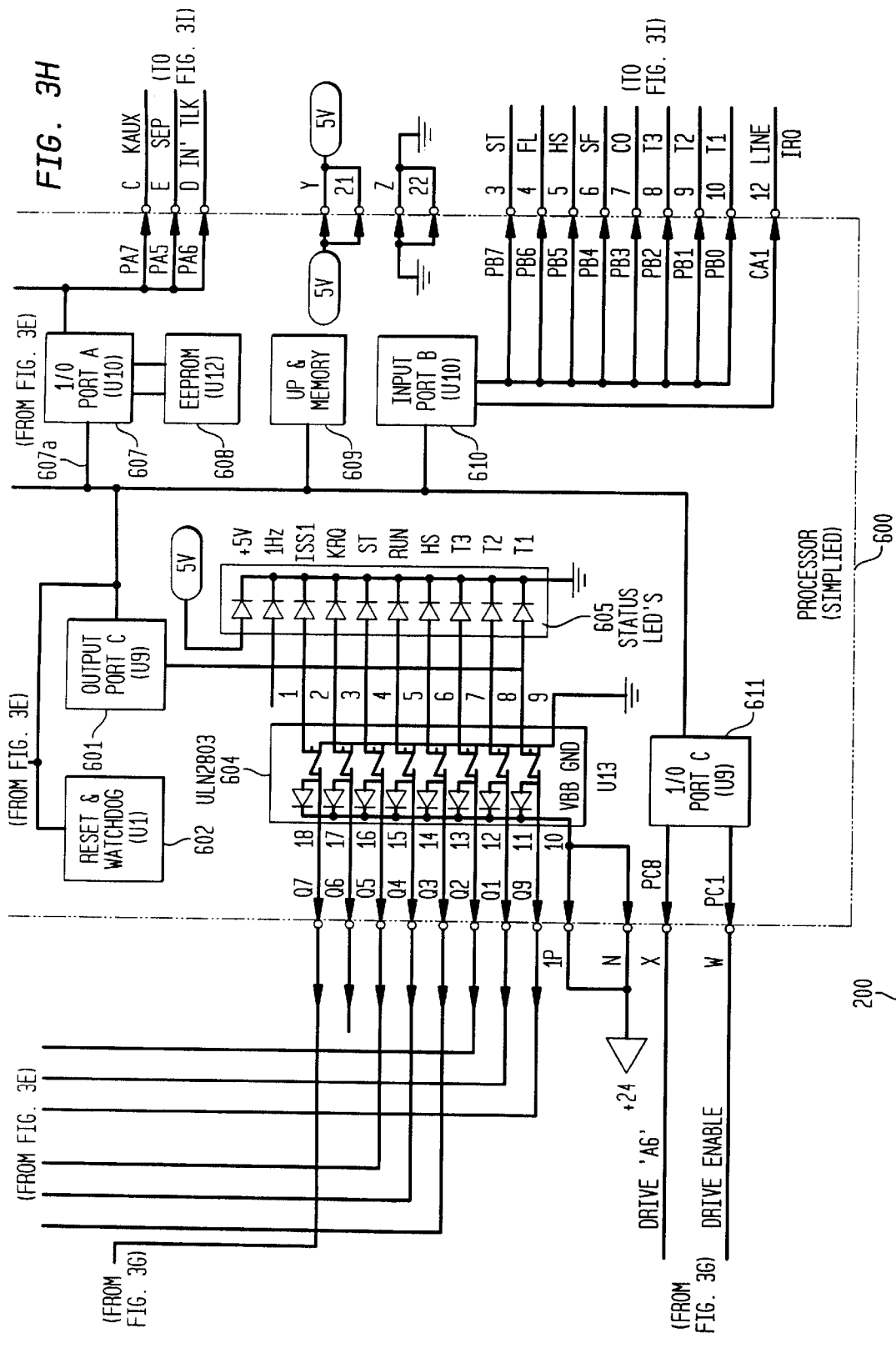

FIG. 2 shows a display and keypad apparatus 10 for use with the embodiment of FIG. 1. The apparatus 10 includes a display 12 and a keypad 30. The display 12 may be an LCD ("Liquid Crystal Display") and currently shows a message of "WAITING TUBE SELECTION"). The keypad 30 includes push buttons or keys 16, 18, 20, 22, and 24. Push Buttons 16 and 18 appear under a heading "Value" and have "−" signs and "+" signs on them, respectively. Typically when inputting data, the "Value" keys may be used to set a particular value or to choose between different values. Push buttons 20 and 22 appear under a heading "Step" have "−" and "+" signs on them, respectively. Typically the "Step" push buttons are used to go the previous or next step in a sequence, such as the programming or "Setup" sequence to be described. The push button 24 appears under "Setup" and has the designation "test" on it and it allows one to exit or enter various modes. The term "exit" also appears under push button 24. All five push buttons are underlined with the term Diagnostics.

FIG. 3 shows a detailed circuit diagram of circuitry 200 for use in accordance with an embodiment of the present invention. The circuitry 200 includes circuit breaker 201 which is connected to a line voltage such as 220 volts A.C. at 60 hertz such as line voltage 102 of FIG. 1. The circuitry 200 further includes a transformer 203, a circuit (P6) 204, and a transformer 205. The transformer 203 can be used as the autotransformer 104 of FIG. 1. Only the secondary winding for the transformer 203 is shown. The circuitry 200 further includes a power relay circuit 300, an inverter/driver circuit 400, a tube select and current circuit 500, a processor 600, and an interface and power supply circuit 700. The inverter/driver circuit 400 may be used as the inverter driver 112 for the FIG. 1 embodiment. The processor 600 may be used as the processor 122 for the FIG. 1 embodiment.

The circuitry 200 includes relays 220 and 221 for switching between R stators and Q stators. The R stator or 'Regular' stator has typically 20 ohms and 50 ohms resistance for the principle and shifted windings respectively. The start voltage for the 'Regular' stator is 500 volts for high speed. The Q stator typically has seven and twelve ohms resistance on the principle and shifted windings, respectively. The high speed start voltage for the Q stator is 350 volts.

The fuses 215, 216, 227, 228, and 229 (formerly 1F1, 1F2 etc.) are used for protection of the autotransformer 104 as well as the load components of the starter (i.e. apparatus 100), such as the low voltage power supplies 701 and 702 in circuit 700. The circuit 230 ("ISS1") is used to turn off the autotransformer 104 during switching of the power relays (such as relays 301a, 301b, 303a and 303b, 304a, 305a, 306a, 306b, 307a, and 307b. This action prevents relay contact arcing which would cause erroneous reset of the processor and could result in shortened life expectancy of the relay. A rectifier 206 is provided, which may be a 35 amp, 1.2 kilovolt bridge rectifier. Capacitors 207 and 208 are provided for storing a D.C. voltage. Resistors 209a and 209b may have values of 0.2 ohms and are used for surge suppression. These two resistors prevent the storage capacitors 207 and 208 from pulling excessive current during a 'high speed start'. Resistor 214 may have a value of 100 kiloohms and is used to discharge the snubber network (comprised of resistor 212 and capacitor 213) connected to the output of the inverter/driver circuit 400 after the inverter/driver circuit 400 has been turned off. Resistor 212 and capacitor 213 form a snubber network. That is, at the instant that the inverter/driver circuit 400 is turned off, resistor 212 and capacitor 213 prevent a fast change in voltage with respect to time (i.e. a high dv/dt or voltage spike) from occurring on the stator wires (such as wires connected to terminal block 504. Capacitor 213 may have a value of 0.68 microfarads. Resistor 223 and capacitor 224, shown by node PS25, have values of 56 kiloohms and 25 microfarads respectively and resistor 223 is used to discharge capacitor 224 in standby, i.e when none of the stators connected to terminal blocks 504, 505, or 506 is active. Capacitors 224 and 225 comprise the phase shift value (in parallel) for low speed. Resistor 226 (can be 56 kiloohms) is used to discharge capacitor 225 (can be 6 microfarads) in standby and are shown by node PS6.

The power relay circuit 300 includes relays 301a, 301b, and 301c which are activated to start high speed rotation. These relays may be part of the relay device 106 shown in FIG. 1. The power relay circuit 300 further includes relays 304a, 304b, and 304c. Relays 304a and 304c are activated to run high speed rotation, while relay 304b is turned off, however, all of these relays may be part of the relay device 106 in FIG. 1. Note that relay 304b closes when it is not active. Relays 303a, 303b, and 303c are also shown and are activated to start low speed rotation of a motor which is run through a stator which is connected to one of terminal blocks 504, 505, or 506 of tube select and current circuit 500. Relays 305a and 305c are activated to run low speed rotation of the motor, while relay 305b is closed. The relays 303a–c and 305a–c may be a part of relay device 108 shown in FIG. 1.

The power relay circuit 300 further includes relays 306a–b. Relay 306a opens and relay 306b closes during high speed operation so that a start signal or run signal for high speed will come in through relay 306b and a start signal or run signal for low speed will be prevented from coming through relay 306a. The relays 306a–b may be part of the relay device 114 shown in FIG. 1. The relays 307a–d allow the appropriate reference signal to pass through. For low speed operation relay 307a is closed, and relay 307b is open allowing a reference signal from node [1] of transformer 203 to pass through relay 307a. For high speed operation relay 307a is open and relay 307b is closed allowing a reference signal from pins [10] and [11] which are tied together of the inverter/driver 400 to pass through relay 307b. Relay 307c closes when relay 307b does and relay 307d closes when relay 307a does.

Operation signals are provided to the power relay circuit 300 through the START (bar), RUN (bar), and HIGH SPEED (bar) signals which are located at output ports or pins 17, 18, and V respectively of the power relay circuit 300. These signals are timed to ensure that power is applied correctly. For example, for a high speed start relays 301a–c are closed. After these relays are closed a START (bar) signal will be provided by the processor 600 along with a signal indicating low speed (i.e. HIGH SPEED (bar) will be high.). The processor 600 uses the START (bar) signal to activate one set of relays 501a–b, 502a–b, and 503a–b and thus to activated the appropriate stator which is connected to one of terminal blocks 504, 505, or 506 and thus the appropriate motor.

The inverter/driver circuit 400 includes a circuit 406 which includes drivers for changing a D.C. (direct current) input at nodes 210 [V−] and 211 [V+] into an A.C. output at pins 5 and 6 (tied together, can be called the first terminal for A.C. signal) and 10 and 11 (tied together, can be called the second terminal for A.C. signal.) of the inverter/driver circuit 400. The driver circuitry 406 includes transistor/diode pairs 406a, 406b, 406c, 406d, 406e, and 406f. The inverter/driver circuit 400 also includes circuits 401, 402, 403, and 404. Each of these circuits includes a D.C. (direct current) to D.C. converter, 24 Volts D.C. and an integrated circuit IGBT ("Insulated Gate Bipolar Transistor") Gate drive optocoupler. These circuits are needed to provide isolated drive to the gates of the IGBT device. A decoder integrated circuit 405 is also shown. It may be a 74S288 integrated circuit decoder. The decoder 405 provides non overlapping signals for drive which prevent damage or destruction of the IGBT devices.

The tube select & current circuit 500 includes relay pairs 501a–b, 502a–b, and 503a–b. Also shown are terminal blocks 504, 505, and 506 each having three terminals: one for the auxiliary winding, one for the principal winding, and one for the common winding of a stator. For example terminal block 504 has terminals A1, P1, and C1 which connect to auxiliary, principal, and common windings of a stator not shown. Similar terminals A2, P2, and C2, as well as terminals A3, P3, and C3 are shown for terminal blocks 505 and 506 respectively, each for connecting to a stator. The tube select & current circuit 500 also includes auxiliary test winding 507 which is connected to auxiliary line 513 and principal test winding 510 which is connected to principal line 514. The feedback windings 507 and 510 allow the current to be measured in the auxiliary and principal windings of the appropriate stator and can be part of the current measurement circuit 124 shown in FIG. 1.

Auxiliary secondary winding 508 which has a resistor 509 in parallel, receives the measurement from auxiliary feedback winding 507 and transmits it to auxiliary amplifier 516. Similarly, principal secondary winding 511 which has a resistor 512 in parallel, receives the measurement from principal test winding 510 and transmits it to principal amplifier 517.

Relays 501c, 502c, and 503c are active when relays 501a–b, 502a–b, and 503a–b are respectively active, and provide an indication to the processor 600 of which terminal block 504, 505, and 506 (and therefore which stator) has been selected. The tube select and current circuit 500 also includes a detector and pulse generator circuit 518 and a gain and selection circuit 522. The gain and selection circuit 522 provides the analog measurement of current (either auxiliary winding or principal winding) at its pin or port 17 and the circuit 522 may be part of the current measurement circuit 124 of FIG. 1. The purpose of the pulse generator circuit 518 is to provide trigger pulses to the interlock circuit comprised of circuit 703 on the interface circuit 700. The circuit 703 outputs Q1 and Q2 have diodes connected to them, D4 and D5, so that the circuit 703 cannot enable the interlock relay circuit 705 without pulses from both windings (principle and auxiliary) of the particular activated stator. The interlock relay circuit 705 is enabled through the safety action of circuit 703 as well as the interlock permission signal from the processor 600 shown as output D or IN'TLK. This is a unique implementation. If the processor circuit 600 fails and somehow incorrectly gives an interlock permission signal on its output D the exposure interlock (relay circuit 705) will not be enabled unless circuit 703 provides output signals at its ports Q1 and Q2 which are derived from current feedback from the principle and current windings of the appropriate stator. This is crucial to preventing exposures (define 'exposures' on a stationary anode (X-ray tube) which would damage the tube. (i.e. current must be running through stator which causes anode to be moving in order for exposure to be performed).

The processor 600 includes analog to digital converter 601, reset & watchdog circuit 602, output port D circuit 603, octal relay driver 604, status LEDs 605, input/output port C circuit 606, input/output Port A circuit 607, EEPROM (electrical erasable programmable memory) circuit 608, microprocessor and memory 609, input port B circuit 610, and input/output port C circuit 611. All of the lines or pins going into the processor 600 can be part of bus 122a of the FIG. 1 embodiment. The reset & watchdog circuit 602 provides a reset pulse to the microprocessor and memory circuit 609 should the processor board circuit 600 cease operation, thereby initializing the microprocessor 609 to 'startup'.

Interface and power supply circuit 700 includes a twenty-four volt D.C. power supply 701, a +/− five volts D.C. power supply 702, a dual one-shot multivibrator 703, a dual peripheral driver 704, two twenty-four volt D.C. relays 705 and 706, a transistor 707, two quad optical isolators 708 and 709. The optical isolator 708 includes LEDs (Light Emitting Diodes) 708a–d and respective corresponding transistors 708e–h. The optical isolator 709 includes LEDs 709a–d and respective corresponding transistors 709e–h.

In operation, the circuit of FIG. 200 functions as follows. A line voltage is taken from nodes 201b (positive terminal) and 201a (negative terminal) by the circuit breaker 201. The line voltage corresponds to line voltage 102 of FIG. 1 and may be 220 volts A.C at 60 hertz.

For the high speed start a voltage signal is taken for the potential difference between node [12] (for an R stator) or node [10] (for a Q stator) and the ground node [1] of the transformer 203. The potential difference between node [12] and node [1] is 420 volts and between node [10] and node [1] is 310 volts. The positive potential (will be termed "positive" although it alternates) of the voltage is applied through the relay 220 (for R stator) or relay 221 (for Q stator) to node A. Relays 220 and 221 (and all other relays) are controlled by the processor 600. The positive potential is then applied through nodes A and through relays 301a and 301b, for the high speed start case, and then to node H. Relays 301a and 301b are also controlled by processor 600 and they are activated for a high speed start signal. The high speed A.C. start signal (note it is not actually "high speed" at this point since it is still 60 Hertz) is then applied to the rectifier 206. The rectifier 206 takes an A.C. signal and produces a D.C. signal at nodes 210 [V+] and 211 [V−]. The capacitors 207 and 208 retain the D.C. signal.

The D.C. signal is input to the inverter/driver 400 at pins 13 and 14 (tied together) and pins 1 and 2 (tied together). The driver circuit 406 takes in the D.C. signal at pins 13 and 17. The driver circuit 406 in cooperation with the circuits 401–404, the decoder 405 and pulses from the processor 600, (Drive 'A0' and DRIVE ENABLE) an alternating square wave is produced between pins 5/6 (tied together) and pins 10/11 (tied together). This square wave has a frequency of 180 Hz. and the appropriate voltage amplitude. The positive potential is applied to relay 306b which is closed for a high speed (180 Hz. case). Note that the relay 306c is open for high speed. The positive potential proceeds to node PS6, and then to a phase shifting circuit comprised of the capacitor 225 and the resistor 226. This phase shifting circuit may be part of the phase shifter 116 shown in FIG. 1.

At node PSC, a phase shifted version for the high speed start signal is obtained. This is applied to the auxiliary line 513. The direct signal is applied to the principal line 514. The phase shifted version of the high speed start signal flows through the feedback winding 507, while the non-phase shifted version flows through feedback winding 510. Secondary windings 508 and 511 pick up a test signal and the respective signals are sent to amplifiers 516 and 517. Either the current from the auxiliary line 513 or from the principal line 514 will be measured and transmitted through the gain and selection circuit 522 to the analogue line at pin 17 of the tube select & current circuit 500.

The current in the auxiliary and principal lines 513 and 514 flows into the appropriate auxiliary and principal terminals (A1, A2 or A3 for auxiliary, P1, P2, or P3 for principal). The processor 600 selects the appropriate set of relays for the appropriate stator. For example, relays 501a–b are selected for terminal block 504 (for a first stator) and connect the auxiliary lines 513 and principal line 514 to terminals A1 and P1 respectively. Relays 501a–b, 502a–b, and 503a–b can be part of relay device 118 of FIG. 1.

The common or low potential, for the high speed start operation, is connected from the inverter driver 400 through the relay 307b (or K6) to one of the common terminals C1, C2 or C3 depending on which stator is connected. For high speed run operation, the voltage is taken from the transformer 203 from the nodes [4] and [1] to give a 75 volt A.C. 60 Hertz signal. This signal is sent to the inverter/driver 400 to derive a 180 Hertz signal in the manner described for the high speed start operation. Otherwise the high speed run operation is similar to the high speed start operation.

For low speed start operation, the inverter/driver 400 is not used. A voltage is taken from the transformer 203 from the nodes [7] and [1] which is a 230 volt A.C. 60 Hertz signal. The positive potential passes through node B and relays 303a and 303b, which are closed by processor 600. The positive potential passes through relays 306a and 306c which are also closed by processor 600. A non-phase shifted low speed start signal is provided prior to node PS6 and a phase shifted low speed start signal is provided at node PSC following the phase shift capacitor 224. Capacitor 224 may be part of the phase shift circuit 116 of FIG. 1. The auxiliary signal and principal signal provided can then be measured as for the high speed case.

For a low speed run signal a voltage signal is taken from nodes [3] and [1] of transformer 203 for a voltage of 55 volts A.C. at 60 Hertz. The positive potential passes through node D and then relay 305a which is closed by the processor 600 for low speed run operation. The remaining part of the operation for the low speed run signal is the same as the low speed start signal.

The low potential or common terminal potential for the low speed cases comes from node E through pins S and 15, through relay 307a and to the appropriate common terminal (C1, C2, or C3).

The relays 501a–b, 502a–b, and 503a–b can be part of the relay device 118 shown in FIG. 1. The rectifier 206 can be part of the A.C./D.C. converter 110 in FIG. 1. The EEPROM 608 may be part of the EEPROM 120 of FIG. 1.

It is preferred that the circuitry 200 of FIG. 3 be programmable. The following are a table of input commands. The input commands would actually be provided in practice not by an operator but by an X-ray machine which would be connected to the starter apparatus 200 of FIG. 3 through the interface circuit 700.

| INPUT COMMAND | DESCRIPTION |
| --- | --- |
| ST | Start Rotation |
| FL | Fluoro |
| HS | High Speed |
| SF | Spot Film/Spot Film Camera (See 'SF Command' in 'Setup' for function) |
| CO | Coast |
| T3 | Tube 3 Selection |
| T2 | Tube 2 Selection |
| T1 | Tube 1 Selection |

In order to program the circuitry 200 a user must enter "SETUP". To enter "SETUP" an operator first presses the "TEST" push button 24 on the keypad 30 shown in FIG. 2, while in standby mode (i.e. no current flowing to any stator windings).

There is a default set of values preprogrammed into the processor circuit 600 for initial setup. Once setup has been entered then the values which were programmed at the previous setup will be displayed.

An operator can change the values as follows. To step through the possible values or increment or decrement values, use the Value "+" push button 18 to increment and the Value "–" push button 16 to decrement. When ready to go to the next step press the "+" push button 22 under "Step". When the operator wants to reprogram a previous step he presses the "–" push button 20 under "Step". The values are stored in EEPROM 608 when the operator finishes the last step.

| PARAMETER (SETUP Step) | VALUES |
| --- | --- |
| 1. Stator Type | (1) 'R' Regular: 20/50 ohms |
| | (2) 'R' Balanced: 25/25 ohms |
| | (3) 'R' S type: 15/30 ohms |
| | (4) 'Q' Low Z: 7/12 ohms |
| | (5) 'Q' (Phillips 'RS'): 11115 ohm . . . requires change in phase shift capacitor and voltage tap changes |
| | (6) 'None' (Disabled): proceed to skip through rest of Setup Steps. NOTE: This parameter determines whether the relays 220 or 221 will be energized for R or Q type stators. |
| 2. Low Speed Boost Time | Can set from .8 to 9.9 seconds in .1 second increments |
| 3. DC Brake Time | Can set from .8 to 9.9 seconds in .1 second increments. |
| 4. Test-Measurement Low Speed | Press and hold the 'Test' button 24 on FIG. 2, for at least 2 seconds after the boost cycle has completed. The start (a/k/a boost) and run current high and low values for the 60 Hertz (low speed) case are automatically |

-continued

| PARAMETER (SETUP Step) | VALUES |
| --- | --- |
| | measured by the processor 600, which adds and subtracts a constant to form low and high values and saves these values to EEPROM 608 in FIG. 3. The start (boost) and run currents are measured and the value of the currents are saved to memory such as EEPROM 608. These current values are held for a sufficient time to stabilize the measurement. If the service jumper (labeled "service" from port PA4 of processor 600 to port 4 of circuit 700) is in the normal position, the measured values are compared to a table of values in EEPROM 608 appropriate to the stator type programmed. If the measured values fall outside the normal range, a "range measurement" error message will be shown on display 12. The values obtained during acceleration and run are adjusted to minimum and maximum values and saved to EEPROM 608. Service Mode: In 'Service Mode' the lookup tables in EEPROM 608 will not be used to verify that the run and start (boost) current measurements fall within an expected range of values. The 'service mode' is used to complete the 'setup' process when the stator (attached to one of stator connections 504–506) and applied voltages are known to be good. The interlock relay 705 is disabled while in service mode. The 'setup' procedure should be completed before returning to 'normal' operation (finish test rotations in 'Service Mode' and program the measured values into the EEPROM 608. |
| 5. High Speed Boost Time | Can set from .8 to 19.9 Seconds (.1 second increments) |
| 6. AC Brake Time | Can set from .8 to 9.9 Seconds (.1 second increments) |
| 7. Test-Measurement High Speed | Press and hold the Test button 24 shown in FIG. 2 on the apparatus 10 for at least 2 seconds after the boost cycle has completed. The start (a/k/a boost) and run current high and low values for the 180 Hertz (high speed) case are automatically measured by the processor 600, which adds and subtracts a constant to form low and high values and saves these values to EEPROM 608 in FIG. 3. The start (boost) and run currents are measured by processor 600 and saved to EEPROM 608. These current values are held for a sufficient time to stabilize the measurement. If the service jumper (on FIG. 3, the line labeled "service" between PA4 of circuit 600 and port 4 of circuit 700) is in the normal position, the measured values of the boost and run currents are compared to a table of values appropriate to the stator type (connected to stator connections 504–506) to be programmed. If the measured values for the boost and run current fall outside the normal range, a "range measurement" error message will be displayed. The values obtained during acceleration (also called boost and start) and run are adjusted to minimum and maximum values and saved to EEPROM 608. Service Mode: In 'Service Mode' the lookup tables in EEPROM 608 will not be used to verify that the run and start (boost) current measurements fall within an expected range of values. The 'service mode' is used to complete the 'setup' process when the stator (attached to one of stator connections 504– |

-continued

| PARAMETER (SETUP Step) | VALUES |
|---|---|
| | 506) and applied voltages are known to be good. The interlock relay 705 is disabled while in service mode. The 'setup' procedure should be completed before returning to 'normal' operation (finish test rotations in 'Service Mode' and program the measured values into the EEPROM 608. |
| 8. Apptication | (1) RAD: All hold (hangover or continuance) functions are disabled. All Fluoro and Spot film commands/functions are skipped.<br>(2) RAD/FL: Always hold (hangover or continuance) for the programmed time. (This is for both high and low speeds).<br>(3) AUTODETECT: Hold (handover or continuance) is enabled if 'FL' or 'SF' commanded. |
| 9. 'FL' Command | (1) LOW SPEED: Low Speed Rotation is initiated.<br>(2) HIGH SPEED: High Speed Rotation is initiated.<br>(3) ENABLES HOLD: No rotation is initiated.<br>Kaux relay (a/k/a relay 706 in circuit 700 on FIG. 3) is not turned on if 'FL' is programmed for high speed. This keeps compatibility with machines which require low speed interlock for Fluoro. |
| 10. Fluoro Hangover (hold) Seconds | Can set to 0–59 seconds in 1 second increments. |
| 11. Fluoro Hangover (hold) Minutes | Can set to 0–59 Minutes in 1 minute increments.<br>Note: 0 minutes and 0 seconds cancels low speed hold. |
| 12. High Speed Hangover (hold) Seconds | Can set to 0–59 Seconds (1 second increments) |
| 13. High Speed Hangover (hold) Minutes | Can set to 0–59 minutes in 1 minute increments. Note: 0 minutes and 0 seconds cancels low speed hold. |
| 14. Exposure Delay | Can set to 0–9.9 seconds in 1 second increments.<br>While in a hold cycle (hangover or continuance) release and reapplication of a rotation command ('FL') removes the exposure interlock signal (i.e. at output port D of processor 600 (INTLK)) for the duration of the programmed delay time. This feature is most often used when a 'spot film camera' is utilized which generally does not allow for enough time for the filaments of the x-ray tube to preheat. |
| 15. 'DSF' Command | (1) LOW SPEED Rotation is initiated.<br>(2) HIGH SPEED Rotation is initiated<br>(3) ENABLES HOLD No rotation is initiated |
| 16. 'HS' Command | (1) HIGH SELECT: Requires 'ST' for rotation.<br>(2) HIGH SPEED: Rotation is initiated<br>(3) NOT ENABLED No high Speed Rotation |
| 17. 'Kaux' relay 706, Programming | (1) ON w/ROTATION: The relay 706 is on while the appropriate tube is being rotated (through the use of current through one of terminal blocks 504–506.) and during brake. Useful for a tube change inhibit signal to the generator 518 of circuit 500.<br>(2) ON w/BRAKE: Useful for a tube change inhibit signal to generator 518 of circuit 500.<br>(3) ON w/HIGH SPEED: Rotation command.<br>Note: not on with high speed Fluoro; this parameter determines what part of the rotation sequence that the Kaux relay (relay 706) is turned on. |
| 18. Interlock Programming | (1) ON w/AC BRAKE: Interlock (relay 705 on circuit 700 in FIG. 3) will be removed if a High Speed Start is applied. This allows the interlock to remain closed during deceleration from high speed to low speed in order to maintain the Fluoro interlock.<br>(2) OFF w/AC BRAKE: Interlock is lost during AC brake period. The starter will not drop out of high speed holdlhangover while 'FL' is applied in order to maintain interlock during Fluoro.<br>Note: This parameter determines if the intertock relay (relay circuit 705) is maintained during a brake in which case the processor 600 supplies pulses to the circuit 703 (U4) on the interface circuit 700 in order to maintain interlock. (interlock means we are active - current flowing to a stator's windings)<br>(3) On LH, ON AC BRKE: The interlock relay 705 will remain on when shifting from low speed to high speed (low to high). The interlock will also remain on while the AC brake is applied to shift from high speed to low speed. Maintaining interlock is useful if a large x-ray tube is utilized and exposure factors permit x-rays before the tube has obtained high speed. This way there is minimum exposure delay when fluoro is low speed and high speed exposure request is made.<br>(4) On LH, Off AC BRK: The interlock relay 705 in FIG. 3, will remain on when shifting from low speed to high speed (low to high). The interlock relay 705 will turn off while shifting from high speed to low speed (during AC brake). Maintaining interlock is useful if a large x-ray tube is utilized (connected to one of stator connections 504–506) and exposure factors permit x-rays before the tube has obtained high speed. This way there is minimum exposure delay when fluoro is low speed and a high speed exposure request is made. |
| 19. Coast Command | (1) DISABLED<br>(2) ENABLED: The 'CO' (coast input) on the interface keeps the x-ray interlock (relay 705 in circuit 700 in FIG. 3) on but removes any run voltage. This is useful for Digital applications to reduce any interference from the starter during acquisition of images.<br>Note: Rotation Command must be present for this command to be accepted. The 'Coast' command will not be accepted while in hold. |
| 20. Coast Time | Can set from 0 to 99 seconds in 1 second increments. If this time is exceeded, the starter will go into fault mode and exposures will be prevented. |
| 21. Press Value buttons 16 or 8 to exit and save values to EEPROM 608. | When the user presses the button 16 "–" the processor 600 goes to the previous step of the steps above (such as from 20. Coast time, to 19. Coast Command). In addition |

-continued

| PARAMETER (SETUP Step) | VALUES |
|---|---|
| | the value set for in this example 20. Coast Time would be saved to EEPROM 608. Similarly when the user presses the button 18 "+" the processor 600 goes to the next step of the steps above (such as from 19. Coast Command to 20. Coast Time) and saves the value in this example for Coast Command in EEPROM 608. |

The following is a table of error messages which will be placed on the display 12 by the processor 600 for the appropriate error. Whenever one of these errors in the below table occurs, the anode rotation (i.e. the current to the appropriate one of terminal blocks 504, 505, or 506 on FIG. 3, and thus to the connected stator) is stopped so that no current is flowing in either the auxiliary line 513 or the principal line 514. If an error occurs pre-rotation or at low speed rotation then the message is output immediately and sometime after an A.C. brake signal is applied. The A.C. brake signal is applied by applying the low speed start condition, i.e. 220 volts A.C. If an error occurs during high speed rotation, then the message is output after the 'AC' brake signal is applied. The circuit 200 returns to normal condition when one of the following conditions occur:
1. The rotation command (either ST, HS, or FL, depending on the programming in the Setup Mode) has been removed and re-initiated.
2. The tube selection has changed.
3. The 'Test'/'Exit' button 24 on the keypad 30 has been pushed (after the rotation command has been removed).
4. Power has been removed and restored.

| Error Message | Explanation |
|---|---|
| 1. P-Pulse Not Low, tube select & current circuit 500, pin 16 | Upon receiving a rotation command, this signal is checked by the processor 600 for a low value at the input R from the detector and pulse generator 518. |
| 2. A-Pulse Not Low, tube select & current circuit 500, pin 15 | Upon receiving a rotation command, this signal is checked by the processor 600 for a low value at the input R from the detector and pulse generator 518. |
| 3. P-Safety Not High, circuit 700, pin 7 | At the moment of changing from accelerate (boost or start) to run, the safeties are enabled. During 'safeties enabled' this signal is monitored for a continuous high. |
| 4. A-Safety Not High, circuit 700 | At the moment of changing from accelerate (boost or start) to run, the safeties are enabled, through PA1 and PA2 of processor 600. During 'safeties enabled' this signal is monitored for a continuous high. |
| 5. 'P' Measurement Not Low | Upon receiving a rotation command, this signal is checked to verify proper operation of the circuitry in circuit 500 which measures the current in the principal line 514 and principal test winding 510. (current should not be flowing) Signal checked at pin 17 of circuit 500. |
| 6. 'A' Measurement Not Low | Upon receiving a rotation command, this signal is checked to verify proper operation of the circuitry in circuit 500 which measures the current in the auxiliary line 513 and auxiliary test winding 507. (current should not be flowing) |
| 7. P-Safety Not Low, circuit 700, pin 7 | During 'Run' the safeties are enabled and this signal is monitored for a continuous low (current is stable). The most likely cause of |

-continued

| Error Message | Explanation |
|---|---|
| | this error would be from intermittent current or intermittent pulses from amplifier 517 in circuit 500. |
| 8. A-Safety Not Low, circuit 700, pin 6 | During 'Run' the safeties are enabled and this signal is monitored for a continuous low (current is stable). The most likely cause of this error would be from intermittent current or intermittent pulses from amplifier 516 in circuit 500. |
| 9. Current Low, 'P' (Main) | During rotation, the measured current (from pin 17 of circuit 500) is compared to the measured values from the 'SETUP' procedure stored in EEPROM 608. If the measured amount is iess than the minimum value from the table, this error is generated. This error is most likely caused by the stator being incorrectly wired to the stator terminals (such as stator terminals 504) or by intermittent current flowing through the stator. |
| 10. Current High 'P' (Main) | During rotation, the measured current (from pin 17 of circuit 500) is compared to the measured values from the 'SETUP' procedure stored in EEPROM 608. If the measured amount exceeds the maximum value from the table, this error is generated. This error is most likely caused by:<br>1. At a new installation, the stator being incorrectly wired to the stator terminal (such as terminal 504 comprising terminals A1, P1, and C1).<br>2. Grounding or shorting of the stator wires.<br>3. If the 'Test-Measurement' was performed with a hot stator, then the maximum measured current could exceed the expected maximum value. Repeat the setup procedure to reestablish minimum and maximum values. |
| 11. Current Low, 'A' (Shifted) | During rotation, the measured current (from pin 17 of circuit 500) is compared to the measured values from the 'SETUP' procedure stored in EEPROM 608. If the measured amount is less than the minimum value from the table, this error is generated. This error is most likely caused by the stator being incorrectly wired to the stator terminals (such as terminal block 504) or by intermittent current flowing through the stator. |
| 12. Current High, 'A' (Shifted) | During rotation, the measured current (from pin 17 of circuit 500) is compared to the measured values from the 'SETUP' procedure stored in EEPROM 608. If the measured amount is exceeds the maximum value from the table, this error is generated. This error is most likely caused by:<br>1. At a new installation, the stator being incorrectly wired to the stator terminal (such as terminal block 504 comprising terminals A1, P1, and C1).<br>2. Grounding or shorting of the stator wires.<br>3. If the 'Test-Measurement' was performed with a hot stator, then the maximum measured current could exceed the expected maximum value. Repeat the setup procedure to reestablish minimum and maximum values. |
| 13. No Current 'A' (Shifted) | During acceleration, if a very low value is returned from the measurement circuit, pin 17 of the circuit 500, then the 'A' (auxiliary) connection (for example A1, terminal block 504) is assumed to be open. |
| 14. No Current, 'P' (Main) | During acceleration, if a very low value is returned from the measurement circuit, pin 17 of the circuit 500 then the 'P' (principal) connection (for example P1, terminal block 504) is assumed to be open. |

-continued

| Error Message | Explanation |
|---|---|
| 15. No Current Detected | During acceleration, if a very low value is returned from the measurement circuits (both 'A' and 'P'), then the 'C' connection is assumed to be open or no stator is connected. |
| 16. Coast Time Out, Error | Coast time exceeded the maximum allowable time programmed in 'SETUP'. |
| 17. Reset During Operation | Hardware Reset: This reset is generally caused by the arcing of relay contacts during a start, run or brake sequence. This is most likely to occur in the event that the solid state relay is shorted or defective in some way. The unit will act like it was just turned on and all of the relays will be cycled. |
| 18. EEPROM Errors | Upon tube selection, (i.e. one of terminal blocks 504, 505, and 506) two separate tests of the values stored in the EEPROM are done. A checksum and a zero byte check are performed to insure the integrity of the data stored from the 'SETUP procedure. If either of the following two messages occurs, then the EEPROM has either lost data or the data has somehow been corrupted. 1. EEPROM CHECKSUM FAILURE 2. EEPROM 0 CHECK ERROR In order to reestablish the data, proceed with the 'SETUP procedure' of the tube which has the EEPROM error. If the EEPROM still has an error message after following the 'SETUP' procedure, the EEPROM is likely defective and will have to be replaced. The EEPROM 'zero byte and 'checksum' are programmed at the exit of 'SETUP'. Note: If all 'SETUP' values are corrupt, hold the 'SETUP' button upon turning the unit on. This will enable you to immediately enter into the setup mode. If the EEPROM is defective, repiace the processor board |

Diagnostics

In one embodiment of the present invention the processor 600 can employ diagnostics to allow a service engineer to check out and evaluate the interaction of the processor 600 and the interface and power supply circuit 700 board as well as checking all processor 600 inputs and outputs.

The service jumper which is labeled 'service' and is shown connected from the processor 600 port F to the port 4 of the interface power supply circuit 700 plays an important role during the diagnostic mode. If the service jumper is in the normal position, the solid state relay (which is circuit 230, ISS1) is left off during all relay selections. Conversely, if the service jumper is in, then the solid state relay will turn on after the relays have been turned on. Please note that the state of the service jumper is only checked as the diagnostic is selected. Therefore, changing the jumper position while in a particular diagnostic will have no effect until the diagnostic is changed.

Whatever tube (of the terminal blocks 504, 505 or 506) was selected when entering into the diagnostic mode is preserved during diagnostics.

| Diagnostics | Explanation |
|---|---|
| 1. Entering Diagnostic Mode | With the ready message on the display 12, press any of the diagnostic push buttons which are push buttons 16, 18, 20, or 22 on the keypad 30 in FIG. 2 (except for the push button 24 labeled "Test"). |
| 2. Diagnostic 1: MUX 'A' Low Gain | Set a low gain on the gain & selection circuit 522 (referred to here as a "MUX") on circuit 500 and addresses the 'A' (auxiliary) feedback. The feedback voltage is fed to the Analogue to Digital Converter 601 which is part of processor circuit 600 and the measured feedback voltage value is displayed on the display 12. Test voltages are provided on the processor circuit 600 board for servicing the feedback circuits on circuit 500). Jumper TP+ to TP2 to inject a positive voltage into the 'A' current measurement circuit. Jumper TP– to TP2 inject a negative voltage into the 'A' current measurement circuit. The typical ADC circuit 601 result is 0 to 3 from the output 601a with no jumper. The typical ADC circuit 601, at output 601a, result with a jumper connected is 45 to 55 decimal. Note: The inverting and non-inverting circuits provide slightly different results (+/–6). |
| 3. Diagnostic 2: Mux 'A' High Gain | Same as diagnostic 1 except that high gain is selected on the gain & selection circuit 522. The typical ADC circuit 601 result at output 601a is 0 to 8 with no jumper. The typical result with a jumper inserted (jumper connects PA4-8 of processor 600 to Ports 1 through 5 of circuit 700) is 170 to 198 decimal. Note: The inverting and non-inverting circuits provide slightly different results (+–6) |
| 4. Diagnostic 3: Mux 'P' Low Gain | Sets low gain on the gain & selection circuit 522 and addresses the 'P' (Principle) feedback, i.e. the output from amplifier 517. The feedback voltage at pin 17 of circuit 500 (derived from amplifier 517) is fed to the ADC circuit 601 in the processor circuit 600 and is displayed on the display 12 of FIG. 2. Test voltages are provided on the board. Jumper TP+ to TP1 to inject a positive voltage into the 'P'current measurement circuit. Jumper TP– to TP1 to inject a negative voltage into the 'P' current measurement circuit. The typical ADC result at output 601a on FIG. 3, is 0 to 4 with no jumper. The typical ADC result at output 601a with a jumper inserted is 25 to 35 decimal. Note: The inverting and non-inverting circuits provide slightly different results (+–3). (The circuits are on circuit 500 CB572, U1). |
| 5. Diagnostic 4: Mux 'P' High Gain | Same as diagnostic 3 except that high gain is selected on the gain & selection circuit 522. The typical ADC circuit 601 result at output 601a is 0 to 8 with no jumper. The typical ADC circuit 601 at output 601a result with a jumper inserted is 150 to 165 decimal. (This is the same jumper as in "Diagnostic 3") Note: The inverting and non-inverting circuits provide slightly different results (+–6). |
| 6. Diagnostic 5: Display Processor 600, Port A | Displays on display 12 of FIG. 2 a binary pattern representing the status of Port A (MSB-LSB) circuit 607 of processor 600. Port A bit assignments are as follows: PA7　Output　$K_{aux}$ PA6　Output　$K_{interlock}$ PA5　Output　SE2 PA4　Input　Service PA3　Output　SE1 PA2　Input　'P' Safety PA1　Input　'A' Safety PA0　Output　Coast Pulses Grounding the input pins at port 607a should cause the above bits PA0–PA7 to go low. The normal binary representation should be: %11110110. I.E. |

| Diagnostics | Explanation |
|---|---|
| | PA7 is high ($K_{aux}$, relay 706 not enabled) |
| | PA6 is high ($K_{interlock}$, relay 705, not enabled) |
| | PA5 is high (circuit 704 not enabled) |
| | PA4 is high (dependent on service jumper) |
| | PA3 is low (SE1 clear to circuit 704) |
| | PA2 is high ('P' Safety not low) |
| | PA1 is high ('A' Safety not low) |
| | PA0 is low (not coast pulses from processor 600) |
| 7. Diagnostic 6: Display Processor 600, Port B | Displays on display 12 a binary pattern representing the status of Processor 600, Port B (MSB-LSB) circuit 610. Optocoupler outputs from circuits 708 and 709 on Interface and Power supply circuit 700 are input to Port B circuit 610. Port B circuit 610 bit assignments are as follows:<br>PB7 Input ST (Start)<br>PB6 Input FL (Fluoro)<br>PB5 Input HS (High Speed)<br>PB4 Input SF (Spot Film)<br>PB3 Input CO (Coast)<br>PB2 Input T3 (Tube 3)<br>PB1 Input T2 (Tube 2)<br>PB0 Input T1 (Tube 1)<br>The normal binary pattern with the interface connector removed should be: %11111111. With the connector installed (circuit 700), then any active input will be represented by a low output. I.E. if Tube 1 (corresponding to terminal block 504 of tube select & current circuit 500 is selected (T1) then bit 0 will be low (a zero) and the binary pattern would be %11111110. |
| 8. Diagnostic 7: Display Processor 600, Port C | Displays a binary pattern representing the status of processor 600, Port C circuit 611 (MSB-LSB). Port C bit assignments are as follows:<br>PC7 Input 'P' pulse<br>PC6 Input 'A' pulse<br>PC5 Output Mux 'A'<br>PC4 Output Mux 'B'<br>PC3 Output Mux 'C'<br>PC2 Reserved<br>PC1 Output Drive Enable<br>PC0 Output Drive 'A0'<br>The normal binary pattern for port C circuit 611 would be: %00011110. Injecting a voltage into TP1 on the tube select & current circuit 500 should cause bit PC6 of circuit 611 to go high ('A' pulse). injecting a voltage into TP2 on circuit 500 should cause PC7 circuit 611 to go high ('P' pulse). See diagnostics 1 through 4. |
| 9. Diagnostic 8: Turn on Low Speed Start Relay | The 'Low Speed Start' relay (includes relays 303a, 303b, and 303c) turned on. |
| 10. Diagnostic 9: Turn on Low Speed Run | The 'Low Speed Run' relay (includes relays 305a and 305c, and relay 305b turns off when relays 305a and 305c turn on) is turned on. |
| 11. Diagnostic 10: Turn on High Speed Relay | The 'High Speed Relays' are turned on (one high speed relay device is comprised of relay 306b, relay 306a turns off when relay 306b turns on; one high speed relay device is comprised of relay 307b and relay 307c, relays 307a and 307d turn off when relays 307b and 307c turn on. |
| 12. Diagnostic 11: Turn on High Speed and Run Relays | The 'High Speed Relays" (comprised of relay 306b, and relay 307b and relay 307c; while relays 306a, 307a, and 307d are turned off, and the 'Run' relays 304a and 304c turned on (relay 304b is turned off). If the service jumper is installed (line labeled service between PA4 of processor 600 and Port 4 of circuit 700), the inverter/driver circuit 400 storage capacitors 207 and 208 for the inverter/driver circuit 400 are charged to about 100 volts DC. |
| 13. Diagnostic 12: Output Drive 'A0' High | Inverter/Driver circuit 400 pin 20 input "DRIVE 'A0'" is set high and "DRIVE ENABLE" input is set low (the inverter should be ½ on). Circuits 402 and 404 should give positive outputs, at pins 1 and 11 respectively, to respective gates of circuits 406c and 406d of the IGBT circuit 406 I.e. This allows static checking of the drive signals. |
| 14. Diagnostic 13: Output Drive 'A0' Low | Inverter/Driver circuit 400 pin 20 input "DRIVE 'A0'" is set low and "DRIVE ENABLE" input is set low (the inverter should be ½ on). Circuits 401 and 403 should give positive outputs, at pins 9 and 3 respectively, to the respective gates of circuits 406a and 406f of the IGBT 406. This allows static checking of the drive signals. |
| 15. Diagnostic 14: Output High Speed Run and Run the Inverter | The 'High Speed Relays' and the 'Run' relay is selected. (Relays 306b, 306d, 307b, 307c, 307e, and run relay 304a; relays 306a, 307d are off) The inverter/driver circuit 400 is put in the running mode by the processor 600 supplying the drive signals. This allows for checking of the inverter drives and outputs. A square wave should appear at the output of the inverter/driver circuit 400 between pins 5 and 6 (tied together) and pins 10 and 11 (tied together). If the service jumper on the interface and power supply circuit 700 is in the service position. On circuit 700 there is a header with a shielding bar and various positions. The header is 'J2' on circuit 700 also called CB573. In this case the positions are labelled normally service, T1, T2, etc. Otherwise, the storage capacitors 207 and 208 will be discharged by the inverter/driver 400 action and no voltage will be present at the output of the inverter/driver 400 after a few moments between pins 5/6 and 10/11. |
| 16. Diagnostic 15: Output High Speed and Start Relays | The 'High Speed Relays' (Relays 306b, 306d, 307b, 307c, 307e, and high speed start relays 301a and 301b) are turned on. The Inverter storage capacitors 207 and 208 are charged to about 500 volts. |
| 17. Diagnostic 16: Turn on Kaux | The 'Kaux' relay 706 is turned on if the service jumper is in the 'Normal' position. The normal/service header (or jumper) is on the power supply and interface board circuit 700.<br>The following occurs on the interface & power supply circuit 700:<br>(1) Circuit 704, pins 2 and 7 are set low. This is the 'SE2' signal from the processor 600. The circuit 704 pin 1 is set low. This is the Kaux relay 706 signal from the processor 600 PA7, pin C.<br>This combination allows the output of circuit 704 (pin 3) to go low and drive relay 706 (the Kaux relay). |
| 18. Diagnostic 17: Turn on Interlock | Interlock relay 705 is turned on (simulation coast mode). The following occurs on the interface & power supply circuit 700<br>(1) Circuit 704 pins 2 and 7 are set low. This is the 'SE2' signal from the processor 600 pin 3.<br>(2) Circuit 704, pin 6 is set low. This is the INTLK signal from the processor 600, pin D.<br>(3) Circuit 703 pins 3 and 11 are set high. This is the 'SE1' signal from the processor 600 board pin H.<br>(4) Circuit 703 trigger pins 2 and 10 are pulsed by processor 600 'Coast Pulses'. This allows the outputs of Circuit 703 (pins |

-continued

| Diagnostics | Explanation |
|---|---|
| | 13 and 5) to go high which in turn, allows the pull-up resistor R1 to turn on transistor 707. The relay driver (circuit 704, pin 5) is low so that the interlock relay 705 can be turned on. |
| 19. Diagnostic 18: Display Low Ram | The particular RAM locations in the microprocessor and memory 609 may be called upon when helping to diagnose problems from the factory. |
| 20. Diagnostic 19: Display Page 2 Ram | The particular RAM locations in the microprocessor and memory 609 may be called upon when helping to diagnose problems from the factory. |
| Exiting Diagnostic Mode | At any time during diagnostics, press the 'Exit'/'Test' button 24 shown in FIG. 2, of the keypad 30 to exit diagnostic mode. |

I claim:

1. An apparatus comprised of:

a processor having an input port and an output port;

a display connected to the output port of the processor;

a current measuring device having a first input port and a first output port, the first output port of the current measuring device connected to the input port of the processor;

wherein the first input port of the current measuring device can be adapted to measure the current in a first winding of a first stator of an alternating current motor;

wherein the processor causes a first message to be placed on the display if the current in the first winding of the first stator falls outside a first range of a first high value and a first low value; and further comprising:

a first relay device for selecting between a first start signal and a first run signal, the first relay device comprised of:

a control input port connected to the output of the processor;

a signal input port connected to the first start signal and the first run signal; and and a signal output port adapted for connecting to the first winding of the first stator of the alternating current motor; and wherein during a start time period, the processor sends a signal to the control input port of the first relay device to cause the first start signal to be transmitted from the signal input port to the signal output port of the first relay device, and to thus be applied to the first winding of the first stator;

and wherein during a run time period, the processor sends a signal to the control input port of the first relay device to cause the first run signal to be transmitted from the signal input port to the signal output port of the first relay device, and to thus be applied to the first winding of the first stator.

2. The apparatus of claim 1 wherein:

the first start signal is an alternating voltage, and the first run signal is an alternating voltage.

3. The apparatus of claim 2 wherein:

the first start signal and the first run signal both have a frequency of about sixty hertz.

4. The apparatus of claim 1 further comprising:

a second relay device for selecting between a second start signal and a second run signal, the second relay device comprised of:

a control input port connected to the output of the processor;

a signal input port connected to the second start signal and the second run signal; and and a signal output port adapted for connecting to the first winding of the first stator of the alternating current motor; and wherein during a second start time period, the processor sends a signal to the control input port of the second relay device to cause the second start signal to be transmitted from the signal input port to the signal output port of the second relay device, and to thus be applied to the first winding of the first stator;

and wherein during a second run time period, the processor sends a signal to the control input port of the second relay device to cause the second run signal to be transmitted from the signal input port to the signal output port of the second relay device, and to thus be applied to the first winding of the first stator.

5. The apparatus of claim 1 wherein:

the first start signal and the first run signal have a first frequency which is low;

and the second start signal and the second run signal have a second frequency substantially higher than the first frequency.

6. The apparatus of claim 5 wherein:

the first frequency is about sixty hertz and the second frequency is about one hundred and eighty hertz.

7. The apparatus of claim 4 wherein:

the first start signal has a first alternating voltage which has high amplitude; and the first run signal has a second alternating voltage which has an amplitude substantially lower than the first alternating voltage.

8. The apparatus of claim 7 wherein:

the first alternating voltage is about 220 volts, and the second alternating voltage is about 65 volts.

9. The apparatus of claim 7 wherein:

the first alternating voltage is about 500 volts, and the second alternating voltage is about 100 volts.

10. An apparatus comprised of:

a processor having an input port and an output port;

a display connected to the output port of the processor;

a current measuring device having a first input port and a first output port, the first output port of the current measuring device connected to the input port of the processor;

wherein the first input port of the current measuring device can be adapted to measure the current in a first winding of a first stator of an alternating current motor;

wherein the processor causes a first message to be placed on the display if the current in the first winding of the first stator falls outside a first range of a first high value and a first low value; and further comprising:

a phase shifter having an input port and an output port;

the input port of the phase shifter connected to the output port of the first relay device; and wherein the output port of the phase shifter is connected to the second winding of the first stator.

11. An apparatus comprised of:

a processor having an input port and an output port;

a display connected to the output port of the processor;

a current measuring device having a first input port and a first output port, the first output port of the current measuring device connected to the input port of the processor;

wherein the first input port of the current measuring device can be adapted to measure the current in a first winding of a first stator of an alternating current motor;

wherein the processor causes a first message to be placed on the display if the current in the first winding of the first stator falls outside a first range of a first high value and a first low value and further comprising:

a keypad comprised of a plurality of buttons and having an output port connected to the input port of the processor;

a second relay device for selecting among a plurality of stators, the second relay device having a control input port connected to the output port of the processor, the second relay device having a signal input port and a plurality of signal output ports;

wherein pressing one or more of the plurality of buttons of the keypad in a first sequence causes the processor to cause the second relay device to transmit signals at its signal input port to the first signal output port of the second relay device, which is connected to the first stator;

and wherein pressing one or more of the plurality of buttons of the keypad in a second sequence causes the processor to cause the second relay device to transmit signals at its signal input to a second signal output port of the second relay device, which is connected to the second stator.

12. An apparatus comprised of:

a processor having an input port and an output port;

a display connected to the output port of the processor;

a current measuring device having a first input port and a first output port, the first output port of the current measuring device connected to the input port of the processor;

wherein the first input port of the current measuring device can be adapted to measure the current in a first winding of a first stator of an alternating current motor;

wherein the processor causes a first message to be placed on the display if the current in the first winding of the first stator falls outside a first range of a first high value and a first low value and further comprising:

a memory device having an input port connected to an output port of the processor and an output port connected to the input port of the processor;

a keypad comprised of a plurality of buttons and having an output port connected to the input port of the processor;

and wherein pressing one or more buttons of the keypad in a first sequence causes the processor to obtain a first current measurement from the current measurement device, to add a high constant to the first current measurement to obtain the first high value, to add a low constant to the first current measurement to obtain a first low value, and to store the first high value and the first low value in the memory device.

* * * * *